United States Patent Office.

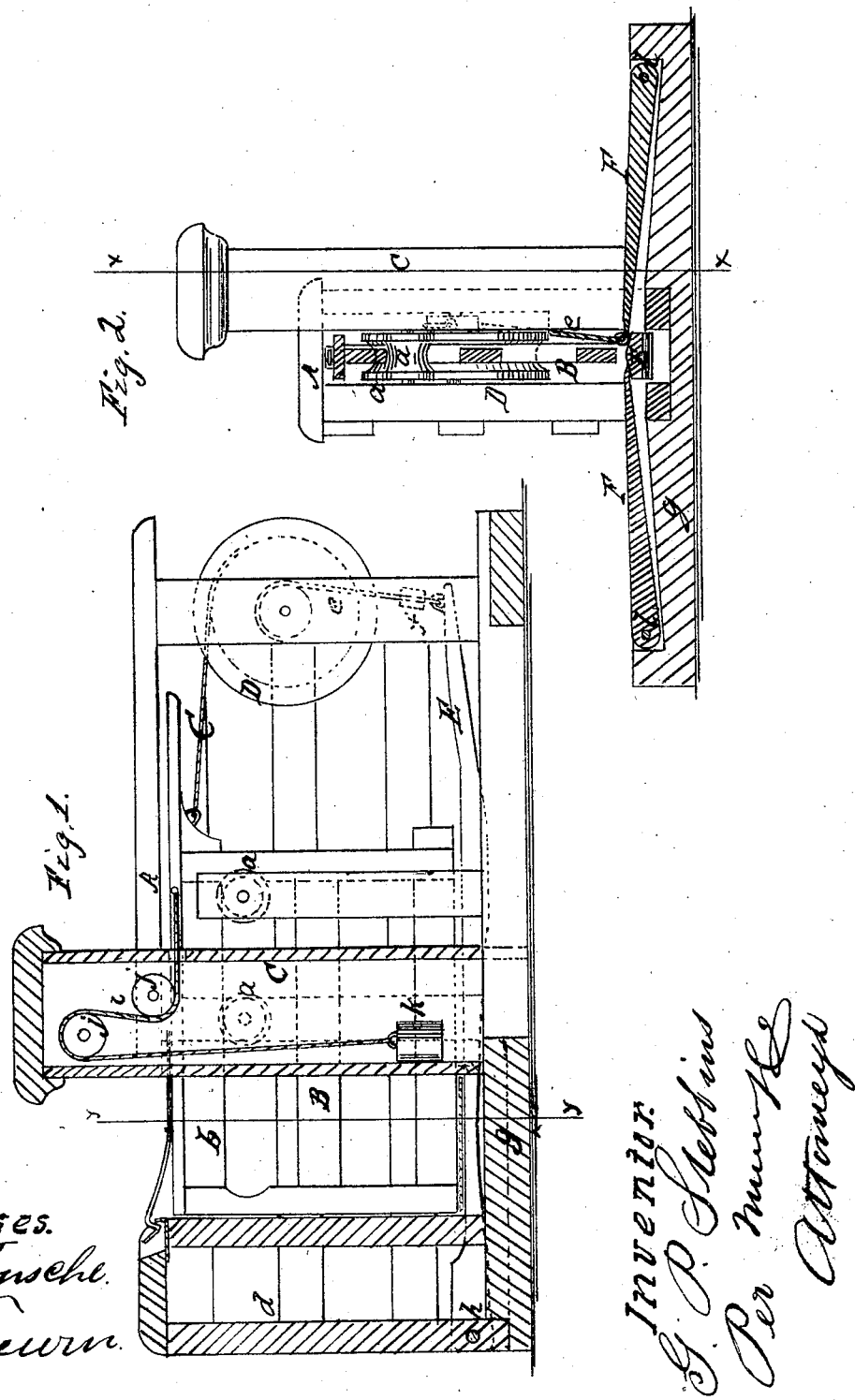

GAIUS P. STEBBINS, OF SPARTA CENTRE, MICHIGAN.

Letters Patent No. 73,206, dated January 7, 1868.

IMPROVEMENT IN GATES.

*The Schedule referred to in these Letters Patent and making part of the same.*

TO ALL WHOM IT MAY CONCERN:

Be it known that I, G. P. STEBBINS, of Sparta Centre, in the county of Kent, and State of Michigan, have invented a new and improved Gate; and I do hereby declare that the following is a full, clear, and exact description thereof, which will enable others skilled in the art to make and use the same, reference being had to the accompanying drawings, and to the letters of reference marked thereon.

This invention relates to a new and improved gate, of that class in which certain appliances are used to admit of them being opened or closed under the weight of the vehicle which passes through them, and which are commonly termed self-acting.

The invention consists in the peculiar means employed for operating or opening and closing the gate, as hereinafter fully shown and described. In the accompanying sheet of drawings—

Figure 1 is a side view of my invention, the case, which contains a portion of the operating parts, being in section, as indicated by the line $x\ x$, fig. 2.

Figure 2, a transverse vertical section of the same taken in the line $y\ y$, fig. 1.

Similar letters of reference indicate like parts.

A represents what may be termed a framing, within which the gate B is hung or suspended on two rollers, $a\ a$, so that it may work freely across the opening $b$, which is between a hollow post or case, $c$, and a post or upright frame, $d$, shown clearly in fig. 1. To the rear end of the upper part of the gate B there is attached a cord, C, which is connected to the periphery of a pulley, D, at one end of the framing A, and to the axis of the pulley D a cord, $e$, is attached, having a weight, $f$, connected to it, said cord being connected to the outer end of a bar, E, which is directly underneath the gate, and is secured at one end to the foundation $g$, as shown at $h$, fig. 1. To the gate B there is also attached a cord, $i$, which passes within the hollow post or case $c$, and under and over pulleys $j\ j'$, said cord having a weight, $k$, attached to its end, as shown clearly in fig. 1. This weight $k$, it will be seen, has a tendency to keep the gate closed. F F are two platforms, placed on the foundation $g$, and connected thereto at their outer end by joints $l$. The inner ends of these platforms rest on the bar E, and said platforms are at the bottom of the space or opening $b$. The weight $k$ is sufficiently heavy to keep the gate B closed, and, consequently, the free or disengaged end of the bar E.

From the above description it will be seen that when the gate is closed, and a vehicle approaches it in either direction, and depresses the platforms F F, and the bar E and the pulley D will be turned, and the gate drawn back and opened by the cord C; and after the vehicle has passed through the space or opening $b$, and leaves the platform F at the opposite side, the gate will be drawn back and closed by the weight $k$.

This gate-operating mechanism may be applied at a very moderate cost, and the gate, in consequence of being hung or suspended on the rollers $a\ a$, will move easily or freely, and the gate may be nearly counterbalanced by the weights $k\ f$, so that a very light vehicle may depress the platforms and open the gate.

Having thus described my invention, I claim as new, and desire to secure by Letters Patent—

The sliding gate B, hung or suspended on rollers $a\ a$, in combination with the weight $k$, the pivoted bar E, platforms F F, and the pulleys D $j\ j'$, all arranged to operate in the manner substantially as set forth.

GAIUS P. STEBBINS.

Witnesses:
 JOHN M. BALCOM,
 VALEDA BALCOM.